United States Patent
Howard

[15] 3,653,679
[45] Apr. 4, 1972

[54] BICYCLE ATTACHMENT AND COMBINATION

[72] Inventor: James N. Howard, 12361 E. Colby Drive, Mishawaka, Ind. 46544

[22] Filed: Nov. 21, 1969

[21] Appl. No.: 878,660

[52] U.S. Cl. .............................. 280/32.7, 280/209, 280/239, 280/289
[51] Int. Cl. ........................................ B62d 63/00
[58] Field of Search .................... 280/204, 202, 239, 289, 36, 280/295, 32.7, 1.184

[56] References Cited

UNITED STATES PATENTS

| | | | |
|---|---|---|---|
| 2,475,177 | 7/1949 | Chouan | 280/204 |
| 2,756,069 | 7/1956 | Manngarn | 280/204 |
| 3,157,913 | 11/1964 | Hubert | 180/9.24 |
| 3,284,096 | 11/1966 | Hansen et al. | 280/239 X |
| 3,387,859 | 6/1968 | McClellan | 280/204 |
| 3,427,037 | 2/1969 | Marasco | 280/1.189 |

*Primary Examiner*—Benjamin Hersh
*Assistant Examiner*—John P. Silverstrim
*Attorney*—Hobbs and Green and Kemon and Palmer & Estabrook

[57] ABSTRACT

An attachment for a bicycle having a wheel positioned rearwardly on the bicycle and a frame connecting the wheel to the rear axle of the bicycle for pivotal movement of the bicycle relative to the attachment. The attachment includes a fixture and an abutment means which limits the angular movement between the bicycle and the attachment when the forward end of the bicycle is reared upwardly. A seat and fender may be mounted on the attachment above the wheel and two closely spaced wheels may be used in place of a single wheel in the attachment.

8 Claims, 10 Drawing Figures

INVENTOR.
JAMES N. HOWARD
BY Hobbs & Green
ATTORNEYS

INVENTOR.
JAMES N. HOWARD
BY Hobbs & Green
ATTORNEYS

INVENTOR.
JAMES N. HOWARD
BY
Hobbs & Green
ATTORNEYS

BICYCLE ATTACHMENT AND COMBINATION

A recent recreational activity and sport of teenagers and youngsters is stunt bicycling, which often consists of rearing the front wheel of the bicycle and riding along on the rear wheel. To do this stunt for any substantial distance or length of time it is necessary to more or less balance the bicycle frame, front wheel and rider as a mass over the center of the rear wheel. In this position the rider is often tilting substantially rearwardly, and if he should become over-balanced rearwardly inadvertently or be forced into that position by a small hill or bank in his path, the rider could be thrown backward to the ground, possibly causing serious injury to his head. There is little danger in this activity with older and more experienced riders; however, children and the inexperienced may fall frequently while learning the rearing and balancing technique. It is, therefore, one of the principal objects to provide an attachment and combination which minimizes the hazard of stunt bicycling of the foregoing type without appreciably restricting the rider in performing the operation, and which permits additional stunts or acts which are not possible with the conventional bicycle alone.

Another object of the invention is to provide an attachment for a bicycle which prevents the rider from tilting over backwards when he rears the bicycle and endeavors to balance on the rear wheel, and which can be readily mounted on most bicycles without making any appreciable changes in the bicycle structure.

Still another object of the invention is to provide an attachment for conventional bicycles which facilitates safe stunts and acrobatics, and which includes a wheel and a seat for supporting and carrying a second person.

A further object is to provide a relatively simple bicycle attachment of the aforesaid type which gives stability to the bicycle without appreciably decreasing its normal maneuverability, and which permits the bicycle to be used conveniently and effectively by one rider without removing the attachment from the bicycle, but which can be easily removed from the bicycle when desired.

Additional objects and advantages of the invention will become apparent from the following description and accompanying drawings, wherein.

Figure 1:
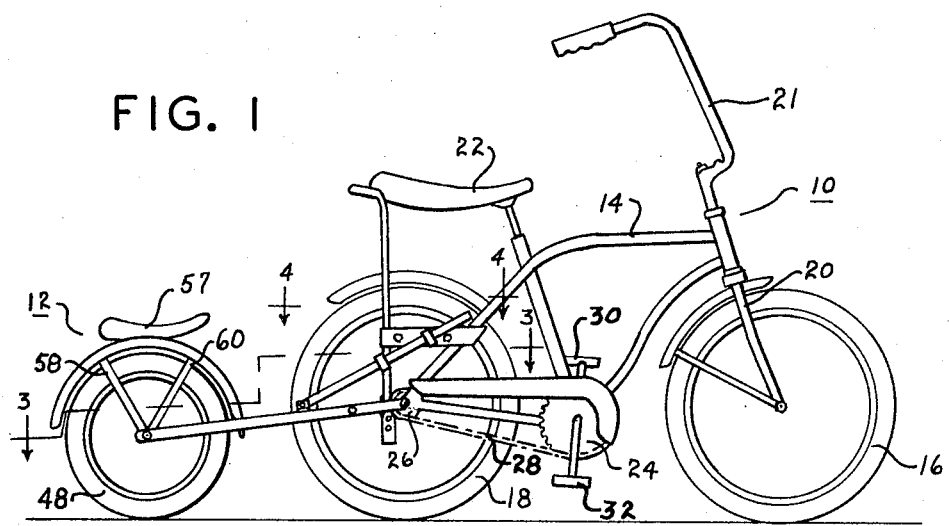
FIG. 1 is a side elevational view of a bicycle with the present attachment mounted thereon in operative position forming the operating combination.

Referring more specifically to the drawings and to FIG. 1 in particular, numeral 10 designates generally a bicycle which for the purpose of the present description may be considered conventional, and numeral 12 designates the present attachment shown connected to the bicycle 10. The attachment can readily be adapted to various standard or conventional bicycles, the one shown being merely for the purpose of illustration. The bicycle includes the usual frame 14, front and rear wheels 16 and 18, front fork and handle bars 20 and 21, and seat 22, and the rear wheel is driven through sprockets 24 and 26 by chain 28 by pedals 30 and 32. Frame 14 contains two downwardly extending and two rearwardly extending frame members which meet in the center at the connecting means 34 in which the rear axle 36 is mounted. Description of further details of the bicycle is not believed necessary to understand the invention, since the parts are conventional and well known in the trade.

The present bicycle attachment consists of a frame 40 having side members 42 and 44 joined by a transverse member 46 for rigidly holding the two side frame members 42 and 44 in spaced relation. The two frame members 42 and 44 extend generally horizontally rearwardly from the rear axle of the bicycle and support a wheel 48 journaled on an axle 50 which extends through openings in the rear ends of members 42 and 44. The axle is retained in place by nuts 52 and 54 threaded onto the opposite ends thereof. In the embodiment of the invention illustrated in the drawings, a fender 56 for wheel 48, and a seat 57 mounted on the fender are supported by members 58 and 60 on each side of wheel 48, the two members on each side being mounted on the respective end of axle 50 and secured thereto by nuts 52 and 54.

Footrests 64 and 66 are preferably provided on frame members 42 and 44 for the rider on the attachment. The side frame members 42 and 44 are pivotally connected to rear axle 36 of the bicycle to permit the bicycle and attachment to pivot angularly in the manner illustrated in FIG. 2. In order to control the rearing operation shown in FIG. 2, side arms 70 and 72 are pivotally connected to frame members 42 and 44, respectively, to pivot means 73 and 74 each consisting of two spaced brackets 75 connected to the respective frame members and a bolt 77 extending through the brackets and the respective arm. These two pivot arms are slidably connected to frame members 78 and 80 on each side of the bicycle by brackets 82 and 84. Each bracket consists of a bar-like member secured to the respective member 78 and 80 by clamps 86 and 88 utilizing bolts 90 and 92, respectively. Eye members 100 and 102 for slidably receiving arms 70 and 72 are pivotally connected to fixtures 82 and 84 by bolts 104 and 106. While the nuts on the respective bolts rigidly attach the bolts to the respective fixtures, the body portion 108 of each eye is adapted to rotate or pivot on the respective bolts to permit the eye to adjust to various angular positions of arms 70 and 72.

Figure 2:
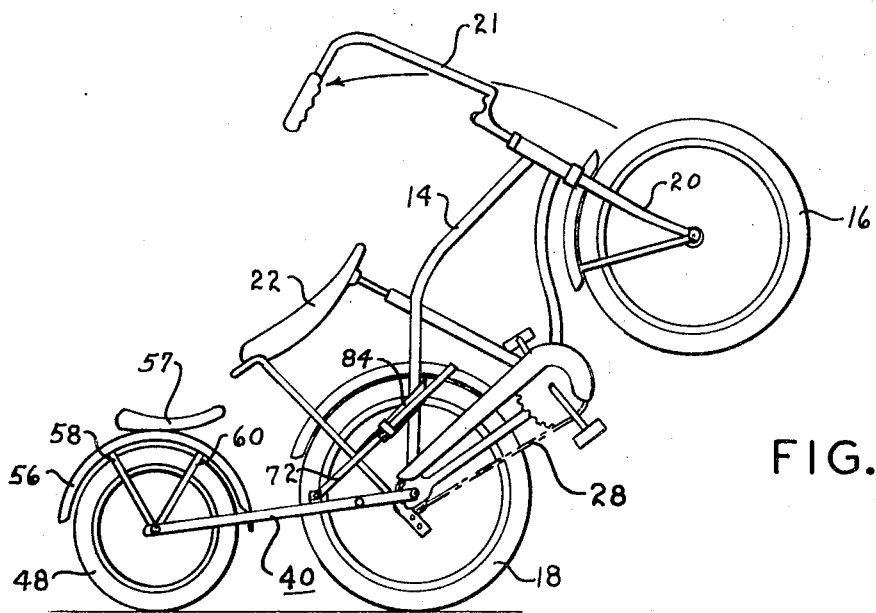
FIG. 2 is a side elevational view similar to that shown in FIG. 1, but showing the manner in which the bicycle-attachment combination may be used.
Figure 3:
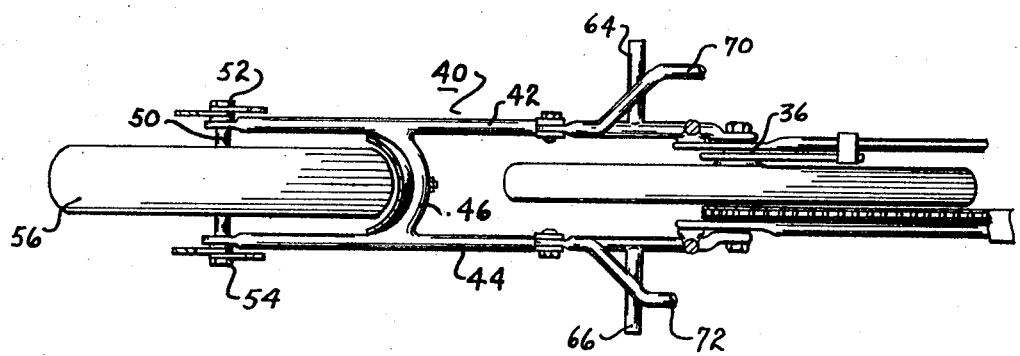
FIG. 3 is a horizontal cross sectional view taken on line 3—3 of FIG. 1 showing only a portion of the bicycle.
Figure 4:
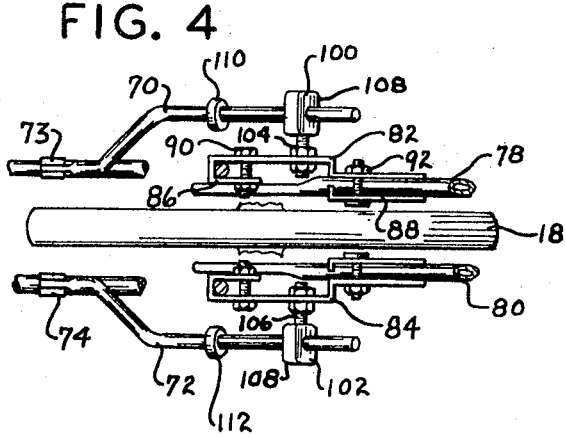
FIG. 4 is a horizontal cross sectional view taken on line 4 — 4 of FIG. 1.
Figure 6:
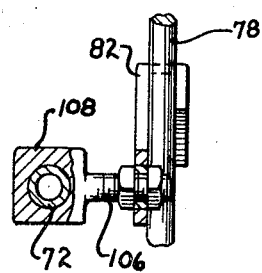
FIG. 6 is a cross sectional view taken on line 6 — 6 of FIG. 5.
Figure 5:
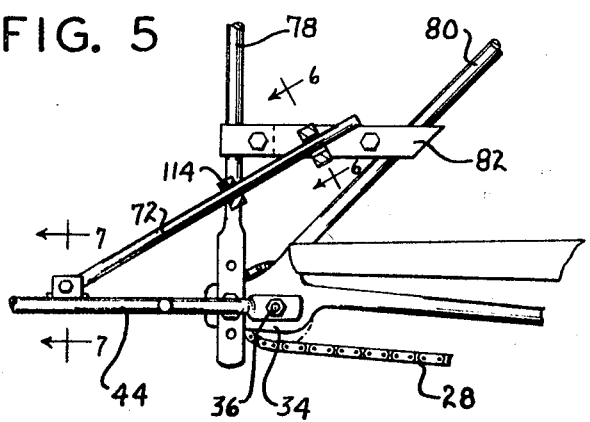
FIG. 5 is a fragmentary side elevational view showing the structure of the bicycle and attachment forming the interconnecting parts thereof.
Figure 7:
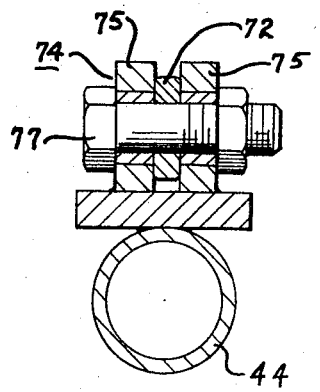
FIG. 7 is an enlarged cross sectional view taken on line 7 — 7 of FIG. 5.

In order to limit the angular movement between the bicycle and attachment, as illustrated in FIG. 2, abutments 110 and 112 consisting of collars are secured to the respective arms by a set screw 114 in each collar and forming a stop which limits the movement of the two eyes on arms 70 and 72 as the eyes slip downwardly on the arms as the bicycle is tilted backwardly. It is thus seen that the bicycle having the attachment connected thereto can easily tilt upwardly and backwardly until the respective eyes 100 and 102 seat on collars 110 and 112. The bicycle is thus held at that position and prevented from tilting further backwardly. This permits the rider to maneuver the bicycle in the reared position without danger of tilting completely over rearwardly. The collars can be adjusted along arms 70 and 72 to vary the maximum tilting position of the bicycle.

Figure 8:
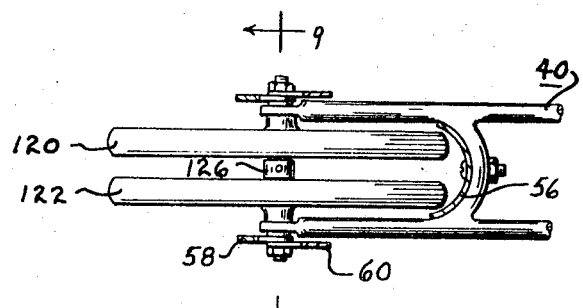
FIG. 8 is a fragmentary top plan view of a modified form of the present invention.
Figure 9:
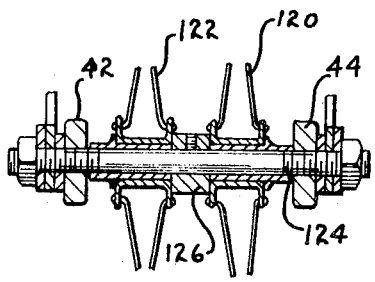
FIG. 9 is a vertical cross sectional view of the modified form shown in FIG. 8, the section being taken on line 9 + 9 of the latter figure.

Wheel 48 is preferably substantially wider than the bicycle wheel in order to give some additional stability to the attachment and bicycle. Further stability is obtained by the use of dual wheels 120 and 122 illustrated in FIGS. 8 and 9. These two wheels are journaled on the axle 124 which in turn is supported by frame members 40 and 42. The two wheels are spaced from one another by spacer member 126, and a fender 56, such as that shown in FIGS. 1 and 2, is preferably used in conjunction with the modified form. The fender supported by side frame members 58 and 60 in the same manner as illustrated in the previous embodiment, and the seat is preferably mounted on the fender or other supporting structure connected to axle 124.

In the use of the present attachment and combination, the attachment is secured to the bicycle by journaling the ends of frame members 42 and 44 on rear axle 36 of the bicycle, and fixtures 82 and 84 are attached to frame members 78 and 80. With the attachment connected to the bicycle in the foregoing manner, arms 70 and 72 extending through eyes 100 and 102 are free to move longitudinally as the bicycle pivots angularly relative to the attachment. The bicycle with the attachment mounted in the foregoing manner may be used in a normal manner, or it may be used with a rider seated on seat 57. For stunt performances, including the rearing of the bicycle upwardly as shown in FIG. 2, there may or may not be a rider on the attachment. As the bicycle rider rears the front wheel and leans backward, he can do this more forcefully without being concerned about balancing his position relative to the center of the rear wheel, since the bicycle is prevented from tilting completely rearwardly and is supported in the reared position by the seating of eyes 100 and 102 on abutments 110 and 112, respectively. When the front wheel is elevated in the position illustrated in FIG. 2, and the eyes are seated on the respective abutments, the bicycle can be easily ridden any distance in that position. While some skill may be required in learning the technique of lifting the bicycle and riding in that manner, the skill required to balance the bicycle in that position is eliminated by the attachment.

Figure 7A:
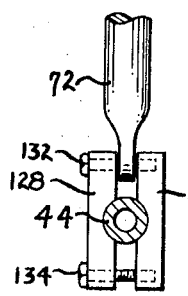
FIG. 7a is a modified form of the same general structure.

In some installations it has been found desirable to adjust the lower or rear pivot point means of arms 70 and 72 along frame members 42 and 44. FIG. 7a shows an adjustable clamp type pivot means consisting of clamp members 128 and 130 secured together on opposite sides of the respective frame member by screws 132 and 134 with the respective arm loosely disposed between the two clamp members.

While only one embodiment and a modification thereof have been described in detail herein, various changes and modifications may be made without departing from the scope of the invention.

I claim:

1. An attachment for a bicycle having a frame and rear axle, comprising a wheel means for constant engagement with the ground, a second axle for said wheel means, a frame connected to opposite ends of said second axle and extending forwardly therefrom, a pivot means adapted to connect said attachment frame to the rear axle of the bicycle for free pivotal movement so that the front of the bicycle may be pivoted upwardly and angularly with respect to the attachment in varying degrees while the bicycle is being ridden, and a fixture means adapted for interconnecting the bicycle frame and said second mentioned frame, having an abutment and a member movable with the tilting bicycle for limiting the upward angular movement of the bicycle relative to said attachment.

2. An attachment for a bicycle as defined in claim 1 in which said fixture means comprises a fixture adapted for connection to each side of the bicycle frame and said member comprises an arm attached to the said second mentioned frame, a pivoted member for each arm having a hole therethrough for receiving the arm and being attached to the respective fixture, and an abutment on said arm.

3. An attachment for a bicycle as defined in claim 2 in which said abutment is adjustable along said arm to vary the angular limit of tilting of said bicycle relative to said attachment.

4. An attachment for a bicycle as defined in claim 2 in which a seat is mounted on said attachment.

5. An attachment for a bicycle as defined in claim 4 in which said attachment has a fender above said wheel means and said seat is mounted on said fender.

6. An attachment for a bicycle as defined in claim 2 in which said attachment has a fender above said wheel means and said seat is mounted on said fender.

7. An attachment for a bicycle as defined in claim 1 in which said wheel means comprises two wheels mounted side by side on said axle.

8. An attachment for a bicycle as defined in claim 2 in which said wheel means comprises two wheels mounted side by side on said axle.

* * * * *